INVENTOR
Bruno O. Weinschel

BY Max L. Libman

ATTORNEY

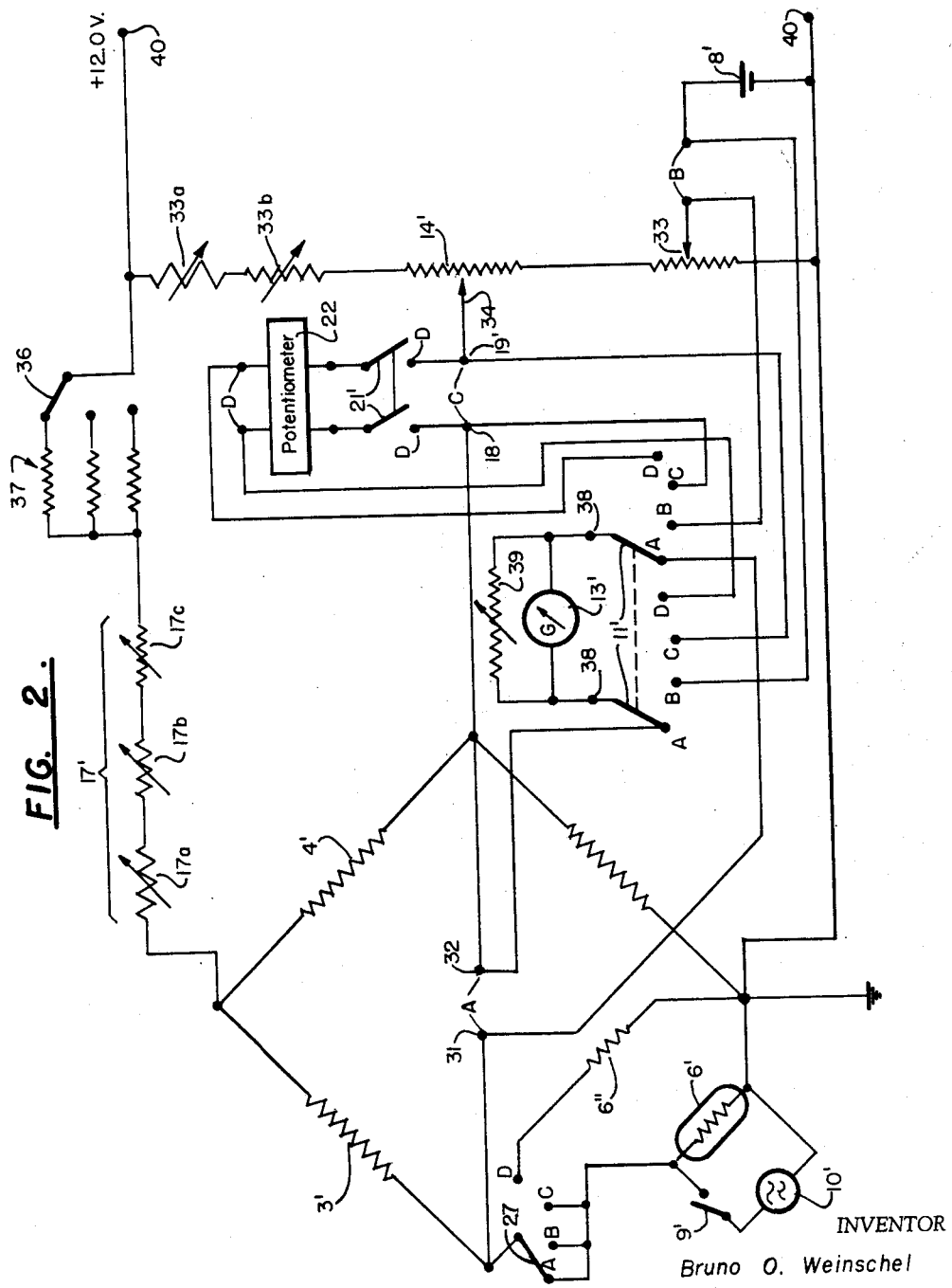

United States Patent Office 3,142,017
Patented July 21, 1964

3,142,017
PRECISION DIRECT CURRENT SUBSTITUTION
BRIDGE FOR MEASURING R.F. VALUES
Bruno O. Weinschel, Bethesda, Md., assignor to Weinschel
Engineering Co., Inc., Kensington, Md., a corporation
of Delaware
Filed July 1, 1960, Ser. No. 40,348
6 Claims. (Cl. 324—106)

This invention relates to devices for measuring high and ultra-high frequency values, and particularly power, and more particularly to a bridge circuit using direct current for the balancing operation for measuring high frequency power with precision.

The calibration of microwave equipment such as signal generators, receivers, attenuators, etc., is usually accomplished by power measuring devices, since in the frequency range from 100 mc. to 10,000 mc., power can more readily be measured with reasonable accuracy than voltage or current. The invention relates to a generally known type of power measuring circuit in which a thin wire, or a bead of semi-conducting material such as a thermistor absorbs the microwave power. This results in a temperature increase which is a function of the power absorbed, and the temperature dependent resistance change of the heated element is used indirectly to measure the absorbed power; therefore, the temperature coefficient of the resistive material is involved in the resulting microwave indication, and must be taken into consideration. In order to minimize this factor, a known method is commonly used, wherein a certain amount of D.-C. or audio frequency bias power is introduced into the microwave absorbing resistor element, which is larger than any microwave power to be measured. The resistor element is then placed in a Wheatstone type bridge circuit, and a balance is obtained, with no microwave power present, by varying the low frequency or D.-C. bias power. Then the microwave power is fed into the absorbing resistor element, resulting in a bridge unbalance, due to the temperature dependent change in resistance of the element because of the added R.-F. power. The D.-C. or low frequency bias power is then decreased to bring the bridge back into balance, that is, to a point where the resistance of the absorbing element is the same as it was before the microwave power was fed to it. It is then assumed that the change in average resistance for an equal amount of low frequency power and microwave power is the same; hence, the amount of low frequency bias power which was withdrawn to obtain re-balance must be the amount of microwave power which the resistance element absorbed; therefore, the value of the change in low frequency power for the two conditions of balance is a measure of the R.-F. power.

Since it is only the difference in bias power between the two balance adjustments above described which is significant, and this difference is usually quite small in terms of the absolute bias power, it is a major difficulty for the bridges of this type to accurately measure small changes in large and widely varying amounts of bias power. Various expedients are commonly employed to minimize this difficulty, for example, the bias power is often divided into two parts. One part is then used for tempertaure and thermistor difference compensation, and is not usually changed between the two balance adjustments. The second part is generally smaller and independent of thermistor characteristics and temperature, and since it is of much smaller magnitude, changes in this second part of the bias power can be accurately determined, therefore this part is varied to compensate for the introduced radio-frequency power. Various expedients are utilized to maintain the independence of these two parts of the bias power, e.g., they may be supplied at different frequencies, etc.

It is a major object of the present invention to eliminate the above difficulty, and to provide a simple means for accurately measuring the small change produced by the introduced R.-F., using a single source of D.-C. or low frequency A.-C. bias power.

Since precision bridges for measuring R.-F. are very expensive, it is a further object of the invention to provide a relatively simple and inexpensive circuit for this purpose, and one which can utilize inexpensive standard precision components such as are usually found in a well-equipped laboratory, thus greatly reducing the expense of the equipment.

The specific nature of the invention, as well as other objects and advantages thereof, will clearly appear from a description of a preferred embodiment, as shown in the accompanying drawings, in which:

FIG. 2 is a more detailed circuit diagram of a practical circuit embodying the invention.

Figure 1:
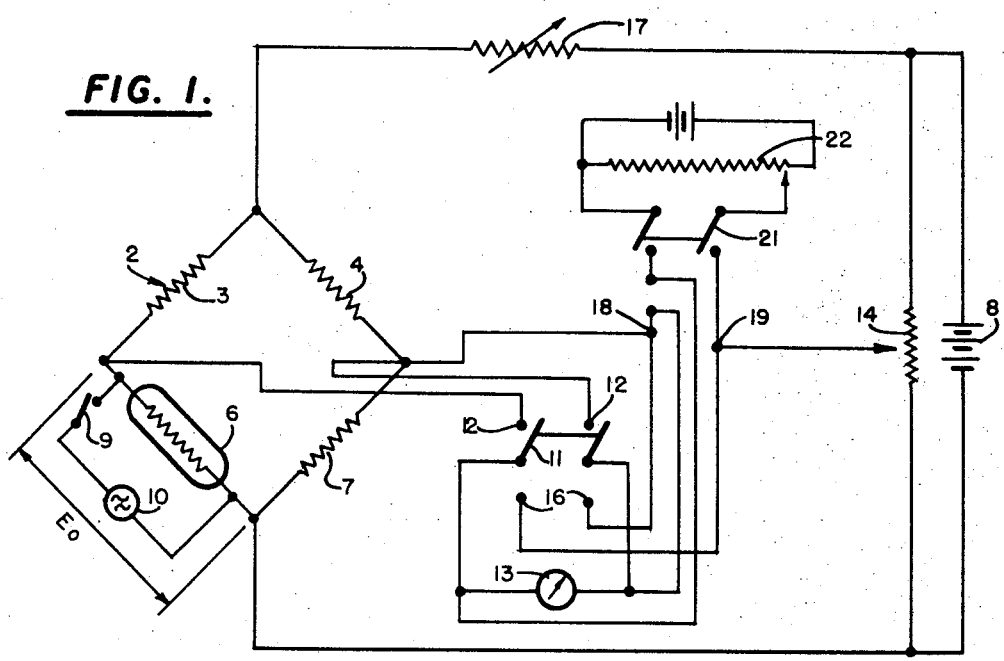
FIG. 1 is a schematic simplified circuit diagram showing the principle of operation of the invention.

Referring to FIG. 1, the basic bridge circuit is indicated at 2, as comprising arms 3, 4, 6 and 7. Arm 6 is the bolometer element, which is the R.-F. power detecting part of the bridge. The bridge is brought to balance initially without R.-F. (switch 9 open) by applying power from D.-C. source 8, with switch 11 closed on terminals 12, thus connecting the galvanometer 13 across the bridge. Typical values for the arms of the bridge are in the order of 200 ohms. The D.-C. voltage across the bolometer without R.-F. power is $E_0$. If R.-F. power is now applied to the bolometer by closing switch 9, some D.-C. power must be removed from the bolometer in order to rebalance the bridge, reducing the D.-C. voltage across the bolometer to $E_1$. The D.-C. substituted power in the R.-F. mount is then:

$$P_{sub} = \frac{E_0^2 - E_1^2}{R_0} \qquad (1)$$

Where $R_0$ is the resistance of the bolometer element 6, at balance, while the "incident R.-F. power" is $$P_{RF} = K\frac{E_0^2 - E_1^2}{R_0} \qquad (2)$$

where K is the calibration factor of the mount. If we define the difference between $E_1$ and $E_0$ as $\Delta E$:

$$E_1 = E_0 - \Delta E \qquad (3)$$

we then obtain $$P_{sub} = \frac{\Delta E(2E_0 + \Delta E)}{R_0} \qquad (4)$$

It will be apparent from the above that in order to measure the R.-F. power $P_{RF}$, it is necessary to know three quantities: K, $\Delta E$, and $E_0$. The calibration factor K is different for each mount, and is generally obtained by sending the mount to the National Bureau of Standards for calibration.

$E_0$ is read directly on calibrated voltage divider 14 by throwing switch 11 into contact with terminals 16, thereby placing the voltage divider in opposition to arm 7 of the bridge, which, of course, has the same voltage drop as bolometer arm 6. Voltage divider 14 is then adjusted by moving its slider until the galvanometer shows zero deflection. When this is done, the voltage indicated by the calibrated potentiometer 14 is equal to $E_0$.

Switch 11 is then thrown back to contacts 12, and switch 9 closed to introduce R.-F. power from source 10 across the bolometer 6. The bridge is then rebalanced by decreasing the D.-C. bias power by adjusting control resistor 17. The voltage drop across bolometer 6 or resistor 7 is now $E_1$, which means that the voltage at point 18 is at this value. The voltage at point 19, by virtue of the previous adjustment of potentiometer 14, is still at the value $E_0$. The voltage difference between points 18 and 19 therefore corresponds to $\Delta E$. This voltage is now measured by closing switch 21, opening switch 11 to the position shown in FIG. 1 and adjusting precision potentiometer 22 to balance. The reading of the precision potentiometer then corresponds to $\Delta E$. Using Formula 4 above, substituted power can now be readily computed, or in practice, will generally be obtained from a catalog of curves $P_{sub}$ vs. $\Delta E$ with $E_0$ as parameter, since $E_0$ will change with ambient temperature, and from one bolometer to another.

It will be apparent that the above arrangement can also be used as a power standard in the following manner:

After the voltage $E_0$ is determined, the bolometer 6 is taken out of the bridge and replaced by a power insensitive precision resistor having the same resistance value as arm 7. Under these conditions the bridge will always be in balance. The D.-C. potentiometer 22 is now placed in the circuit by closing switch 21, and adjusted to a certain voltage $\Delta E$, which corresponds to a chosen standard R.-F. power, for instance, $K \times 1$ mw., or $K \times 10$ mw. The D.-C. bias power is then changed by adjusting resistor 17 until the voltage between terminals 18 and 19 is equal to this voltage $\Delta E$. The bolometer is then switched back into the bridge circuit, and the R.-F. power level adjusted until the bridge is again in balance.

FIG. 2 shows the practical circuit employing the same principle above described. The same reference characters will be used for corresponding elements as in FIG. 1, but with a prime (') added.

Figure 3:
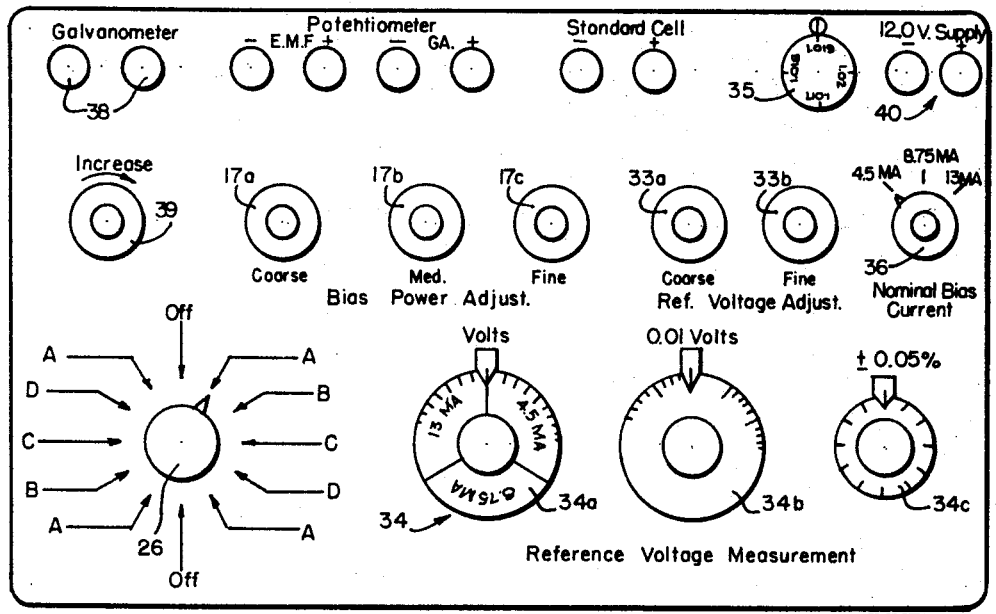
FIG. 3 is a view of a front panel for an instrument embodying the invention, showing the various controls required.

FIG. 3 shows the front view of a control panel for a practical embodiment of this device, wherein the various control knobs and connection terminals are given the same reference characters as the elements in FIG. 2 to which they correspond or to which they control. The main control switch is indicated at 26 in FIG. 3, as a multiple control switch having a plurality of positions respectively marked A, B, C, and D, as well as an "Off" position. The various control switches in FIG. 2 are also marked with capital letters corresponding to the settings of control switch 26, and these letters indicate that when the particular control switch is closed, the front panel control knob 26 is in the position corresponding to the reference letter shown. The actual switch construction is not shown, as it will be apparent that various known types of gang or multiple deck switches may be used for this purpose.

In position A of control knob 26, the galvanometer 13' is placed in the Wheatstone bridge as an unbalance indicator. In other words, in this position, switch 27 is in the position shown in FIG. 2, with the bolometer resistance 6' in the bridge circuit; switch 11' is on the A contacts, thus putting the galvanometer across the bridge terminals 31 and 32, and the rest of the switches shown are open. The bridge is now balanced, as described above in connection with FIG. 1, by adjusting the "bias power adjust" which in this case is represented by three resistance control elements 17a, 17b, and 17c, providing coarse, medium. and fine power adjustment.

In position B of knob 26, the galvanometer 13' is placed between the standard cell 8' and a tap 33 in the voltage divider, to calibrate the voltage divider so that its setting at 34 may be accurately read as a voltage reference. The final reading is given on the panel by three dials also indicated by reference numeral 34 to give a coarse-fine adjustment, and also to compensate for the nominal bias current of the type of bolometer element used. As the potentiometer or voltage divider, and its control knobs, may be of any conventional design, the details of construction form no part of the present invention, and require no further description.

In position C of knob 26, the galvanometer 13' is placed between the voltage divider 14' and the bridge as null indicator for the $E_0$ measurement previously described. The voltage divider is now adjusted by moving tap 34 back, that is, adjusting the knobs 34 on the front panel, until a balance is obtained, and then reading the voltage measurement from the knob settings.

In position D, the D.-C. potentiometer is connected into the circuit by closing switch 21' and a check reading is taken on resistor 6" to check on the possibility of thermistor drift, drift of the R.-F. power, etc. In this position, the bridge can also be used for standard power measurements as described below.

For convenience, the position A is duplicated so that continued movement of the knob 26 in the same direction again connects the galvanometer back into the bridge as an unbalance indicator.

It will be apparent that the above circuit can accomplish any of the operations described in connection with FIG. 1, but includes various practical refinements necessary in a precision instrument. For example, knob 36 is provided which enables any one of three resistors 37 to be switched into the circuit in order to adjust for the different nominal bias current of available standard bolometer elements 6'. Similarly, knob 35 is provided on the panel to compensate for the actual standard cell output. Galvanometer terminals 38 are provided on the panel so an external galvanometer, which is standard laboratory equipment, may be used and control 39 is provided as a sensitivity control, the circuit being as indicated at 39 in FIG. 2. Terminals 40 are connected to a suitable external D.-C. power source, shown in this case as a 12-volt source, and corresponding terminals 40a are provided on the front panel for this purpose.

With the main selector switch 26 in the "Off" position, the "bolometer selector switch" 36 is set to select 4.5, 8.75, or 13 milliamperes of bias current as needed in the R.-F. mount. This switch prevents burnout by excessive bias power. After this is done, selector switch 26 is turned to A and the three "Bias Power Adjust" knobs 17a, 17b, and 17c are adjusted until the bridge is in balance. Selector switch 26 is then rotated to the B position and the two "Reference Voltage Adjust" knobs 33a and 33b are set to produce a zero reading on the galvanometer. The "Reference Voltage Measurement" knobs 34a and 34b are adjusted to approximately the value of $E_0$ expected for the particular bolometer type employed. For example, if a bolometer element utilizes a bias current of approximately 4.5 milliamperes, $E_0$ will be approximately $200 \times .0045$ or 0.9 volt. The voltage expected from the other elements can be calculated in a similar manner. The main selector switch 26 is rotated to the C position and the "Reference Voltage Measurement" knobs 34b and 34c are adjusted until the galvanometer reads zero. The reference voltage $E_0$ can now be read on the two first dials 34a and 34b. The "fine" knob 34c varies the voltage only by $\pm 0.05\%$.

In using the above apparatus to measure an unknown amount of R.-F. power, the following procedure can be employed. The main selector switch 26 is placed in the A position with switch 9' open. The unknown power should preferably be in the range from 0.5 mw. to 3 mw. for the 4.5 ma. barretter; 0.5 mw. to 12 mw. for the 8.75 ma. barretter; and 0.5 mw. to 20 mw. for the thermistor for maximum accuracy. With R.-F. power in the mount, the "Bias Power Adjust" knobs 17 are adjusted until the galvanometer reads zero. Then the selector switch is rotated counter-clockwise to position D, and the external potentiometer is used to measure $\Delta E$ as previously described. The substituted power can then be calculated from Equation 4 or obtained from a graph of $P_{sub} = f(\Delta E)$, with $E_0$ as parameter.

If the apparatus is used to set up as an R.-F. power standard, the following procedure should be employed. It will be understood that the R.-F. power standard again can be set up only in the R.-F. power range mentioned above in measuring an unknown amount of R.-F. power. After the reference voltage $E_0$ is measured as above described, the main selector switch is rotated to the next position D. Either by using Equation 4 again, or by using a special graph $\Delta E = f(P_{sub})$ for $E_0$ as parameter, the $\Delta E$ is determined which, together with the measured $E_0$, will result in the desired R.-F. power level. The D.-C. potentiometer is then set to this $\Delta E$ value, and the "Bias Power Adjust" knobs 17 are adjusted until the galvanometer reads zero. Then the main selector switch 26 is placed into position A and R.-F. power is fed into the mount by closing switch 9'. The R.-F. power level is then adjusted until the galvanometer again indicates zero. This signifies that the desired substituted power is now dissipated in the R.-F. mount, and it can be used as a power standard.

A practical device as described above permits measurement of substituted power to accuracies of better than 0.3%. It is, of course, necessary to maintain the ambient temperature of the bolometer mount constant during the measurement. A heavy bolometer mount having a high heat capacity should be used in any case, but for extreme precision, especially in coaxial lines, it may be necessary to increase the mass of the bolometer mount and add a thermal isolator ahead of the input. The insertion loss of the thermal isolator should be measured accurately and must be corrected for. It should be understood that the above device is a laboratory instrument for use with suitable measuring techniques by skilled personnel. When so used, the device will readily give the degree of accuracy stated.

It will be apparent that the embodiments shown are only exemplary and that various modifications can be made in construction and arrangement within the scope of the invention as defined in the appended claims.

I claim:

1. Apparatus for measuring R.-F. power comprising a bridge circuit, one arm of which includes a bolometric resistor having a substantial temperature coefficient of resistivity; means for supplying D.-C. bias power to said bridge from a D.-C. source; means for adjusting the bias power from said source applied to said bridge until the bridge is in balance; a potentiometer having an adjustable output tap; means for opposing the output of said potentiometer to the voltage drop across one arm of said bridge and for adjusting said tap until the potentiometer output equals said voltage drop; means for supplying R.-F. power to be measured to said bolometric resistor and thereby unbalancing the bridge; said means for adjusting the bias power applied from said variable D.-C. source being further adjustable, without changing the output of the potentiometer, until the bridge is rebalanced; and means for accurately measuring the difference in potential across said arm of the bridge and said potentiometer.

2. The invention according to claim 1, said one arm being an arm which has the same potential across it under balanced conditions as the arm containing the bolometric resistor.

3. The invention according to claim 2, said means for accurately measuring the difference in potential comprising a second potentiometer, and means for balancing the output thereof against said potential difference.

4. The invention according to claim 1, said last means for accurately measuring the difference in potential comprising a second potentiometer, and means for balancing the output thereof against said potential difference.

5. Apparatus for measuring R.-F. power comprising a bridge circuit, one arm of which includes a bolometric resistor having a substantial temperature coefficient of resistivity; means for supplying a D.-C. bias power to said bridge from a D.-C. source; means for adjusting the bias power from said source applied to said bridge until the bridge is in balance; means for applying R.-F. power to be measured to said bolometric resistor; said means for adjusting the bias power from said source applied to the bridge being adjustable to balance the bridge both under condition of R.-F. power supplied and under condition of no R.-F. power supplied to the bolometric resistor; a second adjustable D.-C. voltage source; means for comparing the output of said second source with the voltage drop across an arm of the bridge under one of said conditions of balance, and for adjusting said second source until its output equals said voltage drop; and further means for comparing the potential across said arm of the bridge under the other of said conditions of balance with the unchanged potential output of said second source, and for accurately measuring the difference between said potentials as an indication of the R.-F. power supplied to said bolometric resistor.

6. The invention according to claim 5, said arm of the bridge being an arm which has the same potential across it under balanced conditions as the arm containing the bolometric resistor, said last means for accurately measuring the difference in potential comprising a second potentiometer, and means for balancing the output thereof against said potential difference.

References Cited in the file of this patent

UNITED STATES PATENTS

| | | |
|---|---|---|
| 2,407,075 | Gurewitsch | Sept. 3, 1946 |
| 2,417,820 | Ginzton | Mar. 25, 1947 |
| 2,463,436 | Sorvaag | Mar. 1, 1949 |
| 2,481,589 | Hansell | Sept. 13, 1949 |
| 2,497,094 | Moreno | Feb. 14, 1950 |
| 2,602,828 | Morton | July 8, 1952 |
| 2,728,042 | Ruhland | Dec. 20, 1955 |